(12) United States Patent
Kumar et al.

(10) Patent No.: US 8,775,479 B2
(45) Date of Patent: Jul. 8, 2014

(54) METHOD AND SYSTEM FOR STATE MAINTENANCE OF A LARGE OBJECT

(75) Inventors: Nirman Kumar, Sunnyvale, CA (US); Kaan Baloglu, Palo Alto, CA (US); Dheeraj Pandey, Santa Clara, CA (US); Krishna Kunchithapadam, Portland, OR (US); Sujatha Muthulingam, Sunnyvale, CA (US); Vipin Gokhale, Fremont, CA (US); Bharat Baddepudi, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 771 days.

(21) Appl. No.: 11/830,642

(22) Filed: Jul. 30, 2007

(65) Prior Publication Data

US 2009/0037495 A1 Feb. 5, 2009

(51) Int. Cl.
*G06F 17/30* (2006.01)
(52) U.S. Cl.
USPC .............................. 707/803; 707/740; 707/763
(58) Field of Classification Search
USPC ........... 707/101, 204, E17.005, 740, 763, 803
See application file for complete search history.

(56) References Cited

U.S. PATENT DOCUMENTS

| | | | | |
|---|---|---|---|---|
| 5,661,848 | A * | 8/1997 | Bonke et al. | 711/112 |
| 5,999,943 | A * | 12/1999 | Nori et al. | 1/1 |
| 6,061,763 | A * | 5/2000 | Rubin et al. | 711/129 |
| 6,405,193 | B2 * | 6/2002 | Nakano et al. | 707/3 |
| 6,574,717 | B1 | 6/2003 | Ngai et al. | |
| 6,615,219 | B1 * | 9/2003 | Bruso et al. | 707/699 |
| 6,917,949 | B1 * | 7/2005 | Nguyen | 707/203 |
| 7,047,386 | B1 | 5/2006 | Ngai et al. | |
| 7,249,152 | B2 | 7/2007 | Muthulingam et al. | |
| 7,437,346 | B2 * | 10/2008 | Ashwin et al. | 707/1 |
| 7,467,163 | B1 * | 12/2008 | Dodds et al. | 707/104.1 |
| 7,467,279 | B2 | 12/2008 | Lahiri et al. | |
| 7,526,508 | B2 | 4/2009 | Tan et al. | |
| 7,552,130 | B2 * | 6/2009 | Cook et al. | 707/101 |
| 7,600,063 | B2 | 10/2009 | Loaiza et al. | |
| 2003/0120873 | A1 * | 6/2003 | Kanaley | 711/141 |
| 2003/0220951 | A1 | 11/2003 | Muthulingam et al. | |
| 2005/0055492 | A1 | 3/2005 | Muthulingam et al. | |
| 2007/0086566 | A1 | 4/2007 | Gregerson et al. | |
| 2007/0133571 | A1 * | 6/2007 | Kahn et al. | 370/400 |
| 2008/0098236 | A1 | 4/2008 | Pandey et al. | |

(Continued)

OTHER PUBLICATIONS

"Improving the Write Performance of an NFS Server" by Chet Juszczak. Digital Equipment Corporation.

*Primary Examiner* — Shiow-Jy Fan
(74) *Attorney, Agent, or Firm* — Vista IP Law Group, LLP

(57) ABSTRACT

A method, system and computer program product are described for state maintenance of a large object. In one approach, the method, system and computer program product perform by associating one or more buffers with a transaction involving a large object, the large object data may be accessed using the one or more buffers during the transaction, and storing data for the large object from the one or more buffers in one or more sets of contiguous blocks.

In one approach, a system performs state maintenance of a large object with a cache that associates one or more buffers with a transaction involving a large object, the large object data may be accessed using the one or more buffers during the transaction, and the cache stores large object data from the one or more buffers in one or more sets of contiguous blocks in storage.

21 Claims, 9 Drawing Sheets

(56) References Cited

U.S. PATENT DOCUMENTS

| | | |
|---|---|---|
| 2008/0144079 A1 | 6/2008 | Pandey et al. |
| 2008/0235481 A1 | 9/2008 | Baddepudi et al. |
| 2008/0281846 A1 | 11/2008 | Hoang et al. |
| 2009/0024578 A1 | 1/2009 | Wang et al. |
| 2009/0030956 A1 | 1/2009 | Zhang et al. |
| 2009/0037366 A1 | 2/2009 | Shankar et al. |
| 2009/0037498 A1 | 2/2009 | Mukherjee et al. |
| 2009/0037499 A1 | 2/2009 | Muthulingam et al. |
| 2009/0106281 A1 | 4/2009 | Marwah et al. |
| 2009/0157701 A1 | 6/2009 | Lahiri et al. |
| 2009/0292679 A1 | 11/2009 | Ganesh et al. |
| 2009/0292947 A1 | 11/2009 | Ganesh et al. |

\* cited by examiner

| logical offset of large object 1 402 | data block address 404 | length 406 |
|---|---|---|
| logical offset of large object 2 402 | data block address 404 | length 406 |
| logical offset of large object N 402 | data block address 404 | length 406 |

Inode Chunk Map 400

Figure 4

मेthod AND SYSTEM FOR STATE
METHOD AND SYSTEM FOR STATE MAINTENANCE OF A LARGE OBJECT

FIELD OF THE INVENTION

The invention relates to computer systems, and more particularly to a method and system for implementing state maintenance of a large object in a database management system.

BACKGROUND

Database management systems (DBMS) have traditionally dealt with structured data that is stored in rows and columns. A row, or a tuple of column pieces, is also called relational data. Relational data is typically hundreds of bytes per row and is much smaller than unstructured (or file) data that has traditionally been managed in file systems. A single file (or LOB datatype) object can be anywhere from tens of kilobytes to hundreds and thousands of megabytes and as a result, passing such enormous amounts of bulk data between the network and the disk differs from how a row is transferred between the network and the disk.

In a DBMS, relational data may be passed from the network to underlying storage subsystem of the DBMS without any loss of performance. Optionally, storage of relational data in a database may involve reading in the data values from the network, writing the data values to a cache, and storing the relational data values to the disk. A cache is a collection of data that is a duplication of original values stored elsewhere or computed earlier, when the original data is expensive to fetch or to compute relative to retrieval from the cache.

In a database management system, a large object may be "streamed" into the database management system as a collection of a large number of small network packets. If each network packet of a large object is passed from the network to storage one at a time, then the performance of the database management system may suffer because each network packet would require space allocation, a storage layer update, and multiple Input/Output (I/O) calls for a small amount of data. The piecemeal space allocation for the large object may leave the disk fragmented and subsequent reads of the data may suffer due to the fragmentation. The small and frequent storage layer updates and I/O calls result in suboptimal performance for a large object write. Furthermore, the small disk I/Os waste disk bandwidth with the disk head seek and rotate involved in writing the large object data.

FIG. 1 is a block diagram of a system that illustrates one approach for storage of large objects. In FIG. 1, a Client 100 sends a Network Packet 102 with data for a large object over a Network 104 and the Network Packet 102 is stored temporarily in a Network Component Buffer 106. The Network Component Buffer 106 is a proprietary data structure of the network package that is used for the Network 104. Next, the Database Server 108 allocates space on Disk 114 in accordance with the network packet size and writes the contents from the Database Buffer Cache 110 to Disk 114, as shown with Packet1 of Large Object 116, Packet2 of Large Object 118, and Packet3 of Large Object 120.

As shown in FIG. 1, embodiments of this approach place a strain on the Database Server 108 resources with the streaming of data for the large object from a Network 104. For example, the approach in FIG. 1 requires frequent expensive memory copy calls to stream a large object with the copy of data from the Network Component Buffer 106 to the Database Buffer Cache 110 and from the Database Buffer Cache 110 to the Disk 114 for each network packet received which may place a strain on the Processor 112. As discussed above, the small space allocation, small storage layer updates and small I/Os to disk affect the DBMS loss of performance. As shown in FIG. 1, streaming the data from a Network 104 for the large object results in fragmentation on Disk 114 because the disk space is allocated upon receipt of each network packet and therefore, the space allocation does not result in contiguous blocks on disk. Thus, there is a need to reduce both the fragmentation and the expense on the DBMS that result from the storage of a large object on a disk.

Although embodiments are described in reference to a database server, it should be noted that the state maintenance in the access of a large object can also be used with other types of servers that store large objects.

SUMMARY OF THE INVENTION

A method, system and computer program product are described for state maintenance of a large object. According to some embodiments, the method, system and computer program product perform by associating one or more buffers with a transaction involving a large object, the large object data may be accessed with the one or more buffers during the transaction, and storing data for the large object from the one or more buffers in one or more sets of contiguous blocks.

In one or more embodiments, a system performs state maintenance of a large object with a cache that associates one or more buffers with a transaction involving a large object, the large object data may be accessed using the one or more buffers during the transaction, and the cache stores large object data from the one or more buffers in the one or more sets of contiguous blocks in storage.

BRIEF DESCRIPTION OF THE DRAWINGS

The invention is illustrated by way of example and not limitation in the figures of the accompanying drawings, in which like references indicate similar elements and in which:

FIG. 4 is a block diagram for an implementation of a data structure that maps logical blocks of large object data on disk to the physical blocks on disk.

DETAILED DESCRIPTION

Embodiments of the present invention provide state maintenance for the access of a large objects. Access of a large object encompasses reading and writing a large object, and hereinafter, access will be used to refer to all types of access of a large object.

Figure 1:
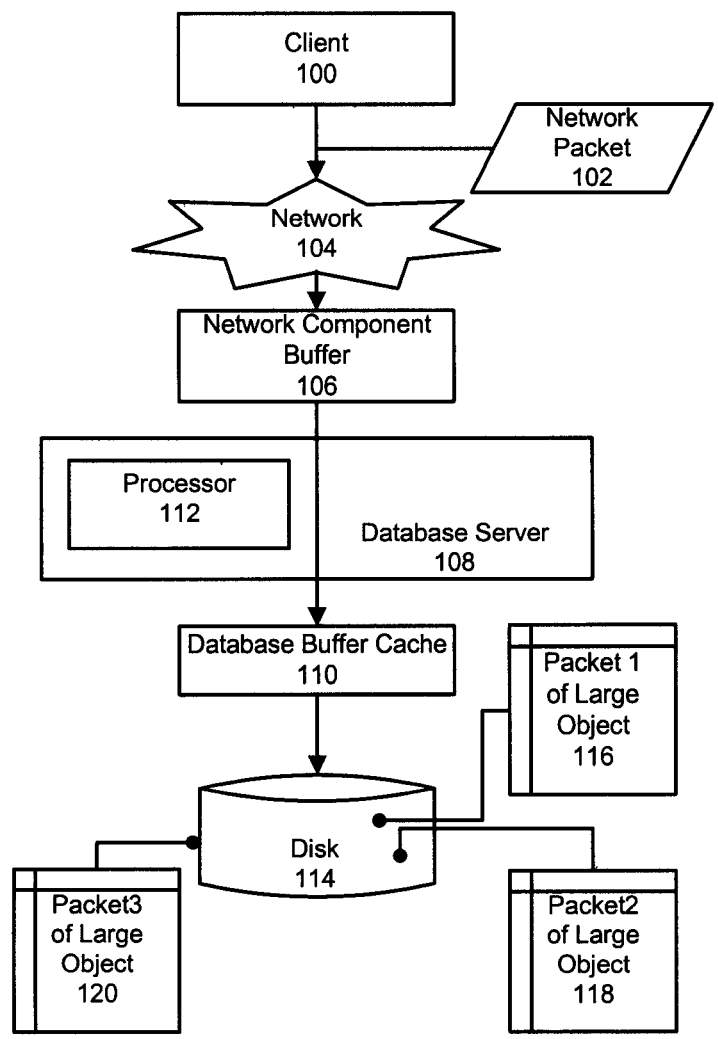
FIG. 1 is a block diagram of system that illustrates an approach for storage of large objects.
Figure 2A:
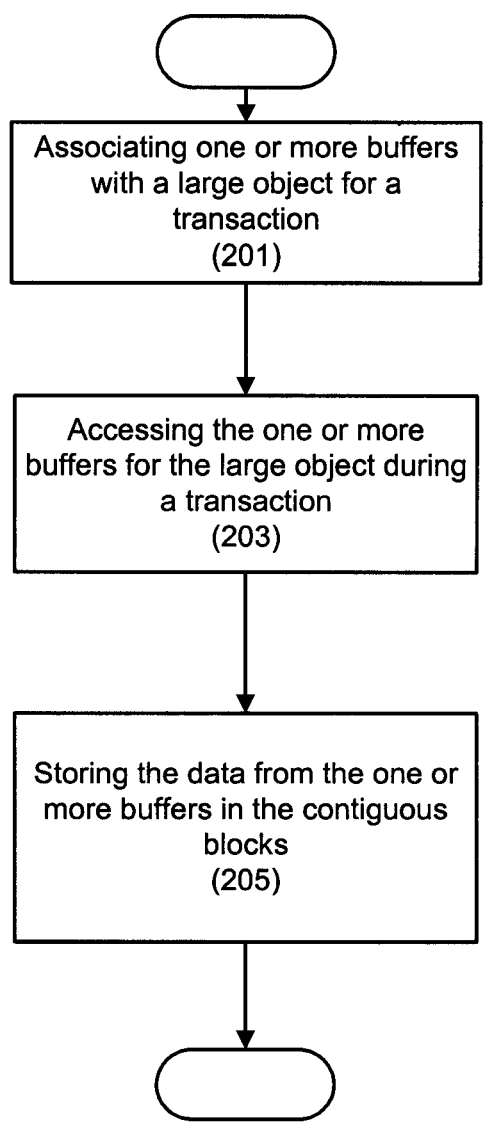
FIG. 2a shows a flowchart of a process for implementing state maintenance for the access of a large object.

FIG. 2a shows a flowchart of a process for implementing state maintenance for the access of a large object. As shown in FIG. 2a, one or more buffers are associated with a large object for a transaction (201) upon initiation of a transaction involving an access of a large object. Next, the one or more buffers for the large object are filled with data during a transaction (203). In one or more embodiments, the buffers allow the transaction to be atomic because the state of the large object is maintained for the duration of the transaction. The data from the one or more buffers may then be stored, preferably in contiguous blocks (205).

Figure 2B:
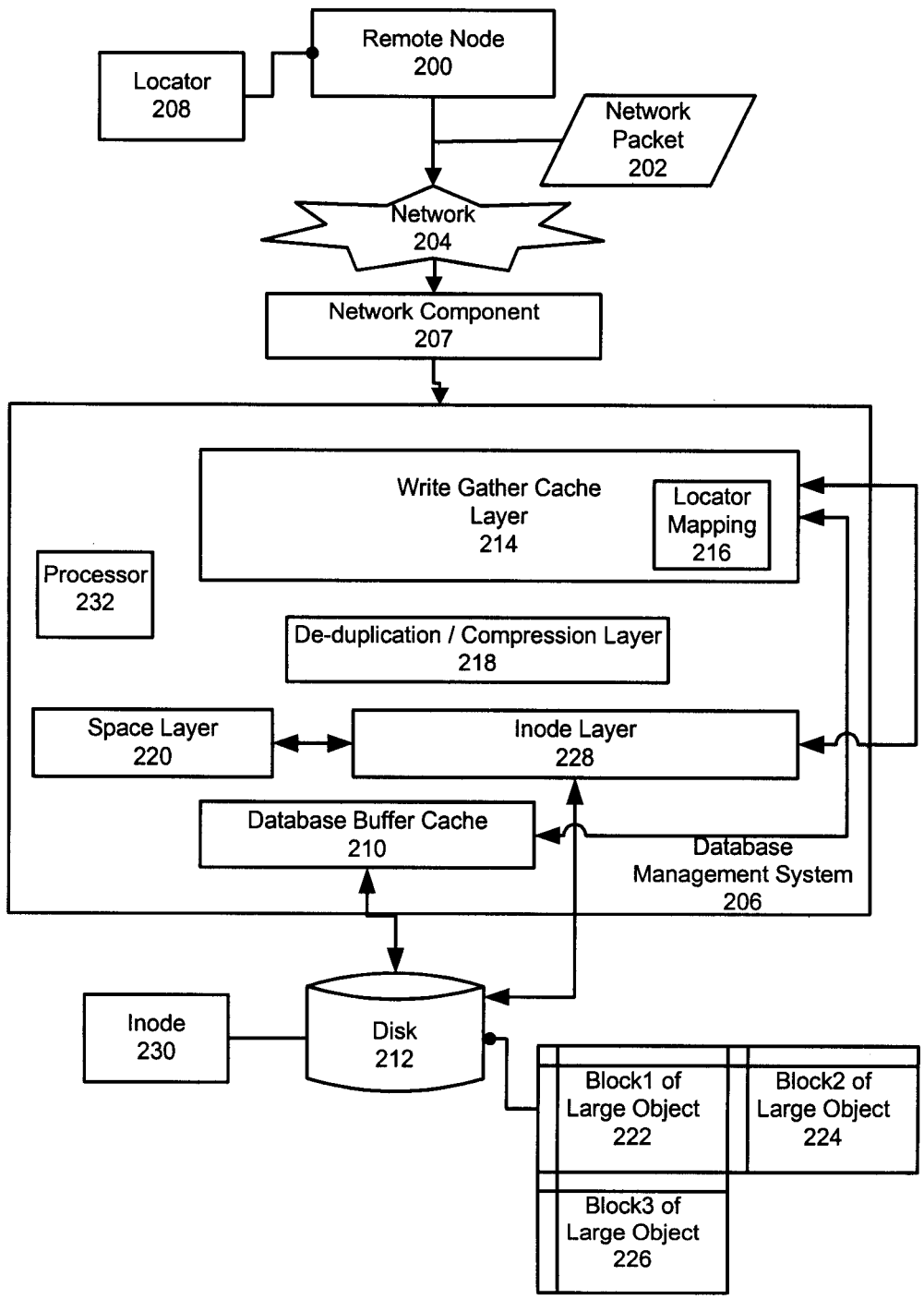
FIG. 2b shows an architecture for implementing state maintenance for the access of a large object.

FIG. 2b shows an architecture for implementing state maintenance for the access of a large object. In FIG. 2b, a Remote Node 200 sends requests in Network Packets 202 over the Network 204 to the Database Management System 206 in order to access a large object with the use of a Network Component 207. The Network Component 207 may be an Application Programming Interface (API) that provides the ability to read data from the Network 204 (e.g. socket programming). In one or more embodiments, the Remote Node 200 may have a Locator 208, provided by Database Management System 206, that is a handle for a large object in order to access the large object. In one or more embodiments, the Locator 208 may indicate the state of the large object for a particular access by the Remote Node 200 as of a point in time. A Remote Node 200 may have multiple Locators 208 that each has a reference for the state of the large object at different point in time.

The Database Management System 206 may be implemented as a server running database management software. A Database Management System 206 server has one or more Processors 232 for executing the instructions for the database management system. In one or more embodiments, database management systems may be implemented as a cluster with multiple instances of the database management software running simultaneously on multiple computers to handle database requests while accessing a single database. A cluster is a group of computers that work together so that in many respects they can be viewed as though they are a single computer.

Optionally, the Database Management System 206 may employ the use of a Database Buffer Cache 210. With a clustered database, the database buffer caches on each computer may operate as a single, global cache to ensure that all instances of the database management system software have access to the cached data to handle database requests. The Database Buffer Cache 210 stores data to be written to or from the database, a collection of data stored on one or more disks, in order to service database requests without the I/O read and write costs. The underlying storage used by a Database Management System 206 may take on many forms including but not limited to one or more Disks 212 on a network.

The Database Management System 206 uses a Write Gather Cache Layer 214 to implement state maintenance for transactions 1 . . . N involving the access of one or more large objects by a Remote Node 200. In one or more embodiments, the Write Gather Cache Layer 214 may have state information associated with each transaction and/or file for the Remote Node 200 involving the access of a large object. An implementation of a Write Gather Cache Layer 214 will be described in further detail below with FIG. 3. By maintaining state in buffers for each transaction, the Write Gather Cache Layer 214 ensures that the transaction is isolated, not visible to other transactions because the gathered data is dirty, not written to storage, and will remain dirty until the transaction is committed. In one or more embodiments, the Write Gather Cache Layer 214 may request buffers from the Database Buffer Cache 210 to enable access of a large object by a Remote Node 200. The Write Gather Cache Layer 214 posts the buffers to the Network 204 to allow the Network Component 207 to write the Network Packets 202 to buffers in the Write Gather Cache Layer 214 instead of the proprietary network buffers of the Network Component 207 allowing for a decrease in the cost associated with copying data between the Network Component 207 and the Database Cache Buffers 210.

The Write Gather Cache Layer 214 is associated with a Locator Mapping 216 to assist in tracking the state of an access of the large object by the Remote Node 200. The Write Gather Cache Layer 214 buffers for the large object, accessed by the Remote Node 200 in the transaction, may have been flushed, written to Disk 212 since the last access of the large object by the Remote Node 200. In order to ensure that the Remote Node 200 is able to have access to the data expected in the Write Gather Cache Layer 214 buffers, the Locator Mapping 216 indicates whether the Write Gather Cache Layer 214 buffers contain the data of the large object that the Remote Node 200 expects. In one or more embodiments, the Locator Mapping 216 indicates whether the large object has been written to Disk 212 since the last access by the Remote Node 200. To ensure consistent access of the large object, the Locator Mapping 216 may have a snapshot of the database at a point in time after the large object has been written to Disk 212.

In one or more embodiments, the Database Management System 206 has a De-duplication Layer 218, a Compression Layer 218 or both layers to reduce the amount of data written to Disk 212. Compression has been described in U.S. application Ser. No. 11/584,415, entitled "System and method for data compression" having, the disclosure of which are hereby expressly incorporated by reference in their entirety. De-duplication has been described in U.S. application Ser. No. 11/584,782., entitled "System and method for data de-duplication" having, the disclosure of which are hereby expressly incorporated by reference in their entirety.

In one or more embodiments, the Database Management System 206 has an Inode Layer 228 to provide an interface for an Inode Chunk Map 230, a data structure with a mapping of the logical blocks used for the large object to the physical block location of the large object on Disk 212. An implementation of an Inode Chunk Map 230 will be described in detail with FIG. 4 below.

After the data from the large object to be written to Disk 212 has been determined, one or more embodiments of a Database Management System 206 use a Space Layer 220 that keeps track of the space that is available on the Disk 212 for the large object to be written. In one or more embodiments, the Space Layer 220 indicates both the used and unused space on Disk 212. After the space available has been determined with the Space Layer 220, the large object is written to Disk 212 in Block1 of Large Object 222, Block2 of Large Object 224, and Block3 of Large Object 226. By delaying the write of the large object to Disk 212 with the use of the state maintenance, the Space Layer 220 is able to allocate contiguous blocks on Disk 212 to the large object.

Figure 3:
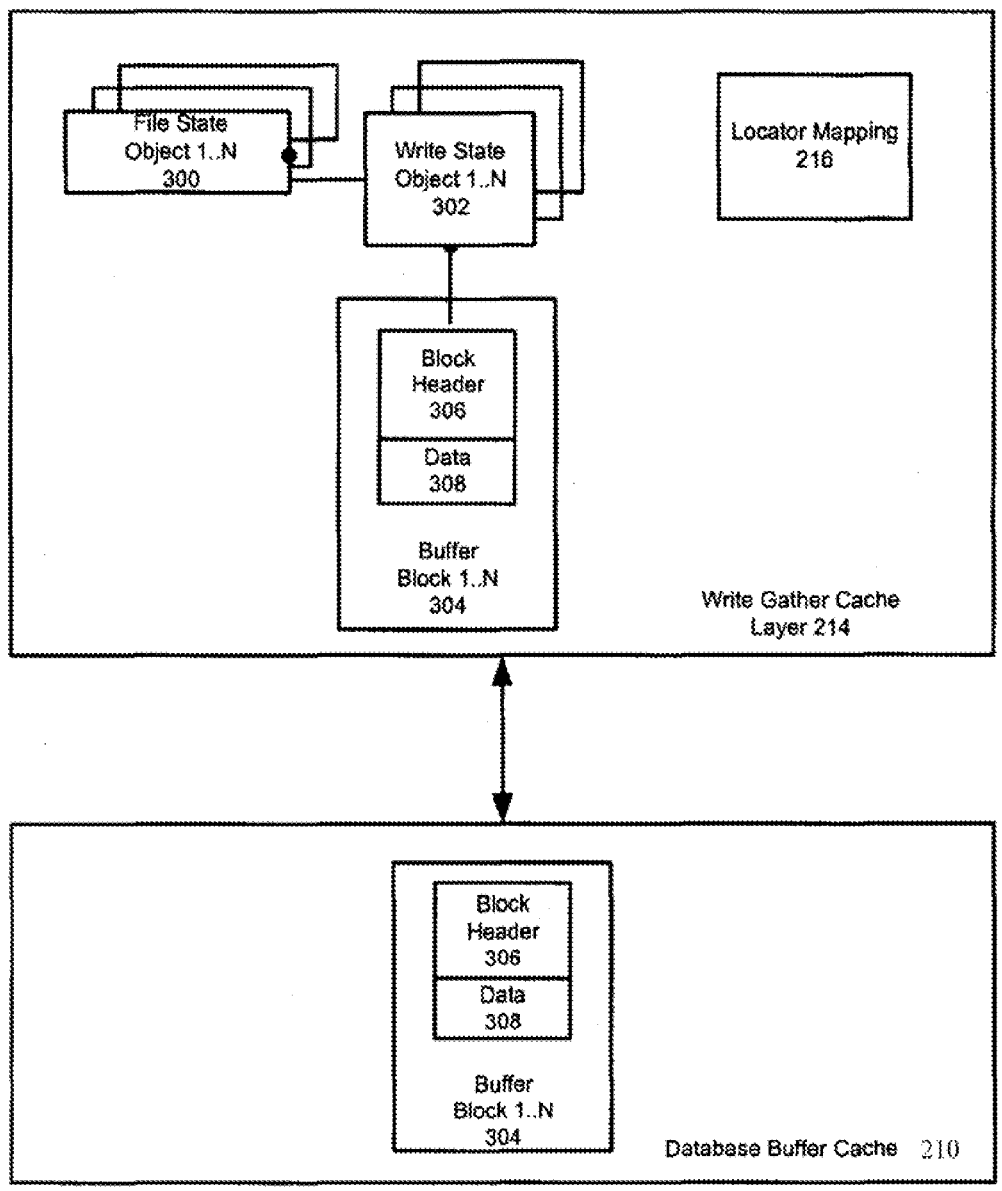
FIG. 3 illustrates an implementation of a Write Gather Cache Layer and the interaction between a Write Gather Cache Layer and a Database Buffer Cache.

FIG. 3 illustrates an implementation of a Write Gather Cache Layer and the interaction between a Write Gather Cache Layer and a Database Buffer Cache. The Write Gather Cache Layer 214 may manage state for one or more transactions involving the access of large objects of the Remote Node 200. In one or more embodiments, the Write Gather Cache Layer 214 may instantiate File State Objects 1 . . . N 300 for each large object accessed by a Remote Node 200, Write State Objects 1 ... N 302 for each unit of Network I/O to be accessed by the Remote Node 200, and any number of Buffer Blocks 1 ... N 304 to store the large object. The Buffer Blocks 1 ... N 304 are the buffers for use by the Remote Node 200 in the transaction for the large object. For example, if the Network Packet 202 size is 32KB and the large object size is 4MB, then a File State Object for the 4MB large object may have 128 Write State Objects with one or more buffer blocks that hold 32KB.

In one or more embodiments, the Write Gather Cache Layer 214 may request the Buffer Block 1 ... N 304 from the Database Buffer Cache 210. The Database Management System 206 may determine the appropriate block size to enable writing the large object data to Disk 212. Embodiments may employ the use of vector of buffers (e.g. an iovec data structure) to keep track of the Buffer Blocks 1 ... N 304 in order to allow the Network Component 207 to write to buffers that may not be contiguous in memory. Buffer Blocks 1 ... N 304 may be implemented to store both metadata for the large object that may be used by the Database Management System 206 and the large object data itself. For example, a Buffer Block 304 may be implemented to have a Block Header 306, to store metadata on the large object, and a Data 308 portion to store the data for the large object itself.

Continuing with FIG. 3, a Write Gather Cache Layer 214 may have a Locator Mapping 216 to identify the point in time as of which the data of a large object the Remote Node 200 expects to access for a transaction. The Write Gather Cache Layer 214 may need to flush the buffers of a File State Object 300, write the contents of one or more Write State Objects 1 ... N 302 of the File State Object 300 to Disk 212, and the Write Gather Cache Layer 214 may need to provide data that the Remote Node 200 expects to access in a transaction in buffers of the Write Gather Cache Layer 214. For example, if a threshold for the amount of unwritten data beneficial for the Write Gather Cache Layer 214 to keep in the buffers has been reached, the Write Gather Cache Layer 214 must be flushed, the data in the File State Object 300 written to Disk 212.

The Locator Mapping 216 may provide information to reconcile the differences between the data expected to be accessed by the Remote Node 200 and the data for the large object on Disk 212. In one or more embodiments, the Locator 208 for a Remote Node 200 will store a snapshot, a record of the state of the database, for the last interaction the Remote Node 200 had with the Database Management System 206 and the Locator Mapping 216 will store a snapshot after the data from the Write Gather Cache Layer 214 buffers for a large object were flushed. The Locator Mapping 216 may map the snapshot in the Locator 208 to a different snapshot of the database after a flush of the large object to account for the delayed write of the data to Disk 212. The Write Gather Cache Layer 214 may use the information from the Locator 208 and the Locator Mapping 216 to retrieve the data from Disk 212 and put the data in the buffers that the Remote Node 200 expects to access in a transaction. A mapping of the contents of the Disk 212 may be used to retrieve the data from the Disk 212 required by the Remote Node 200.

FIG. 4 is a block diagram for an implementation of a data structure that maps logical blocks of large object data on disk to the physical blocks on disk. In one or more embodiments, an Inode Chunk Map 400 has Logical Offset of a Large Object 1 ... N 402 that maps to its respective Physical Data Block Address 1 ... N 404 and the data at the Physical Data Block Address 1 ... N 404 has a length as designated by the associated Length 406. For example, the Logical Offset of a Large Object 1 ... N 402 may designate chapters of a media content (e.g. movies, books).

Figure 5:
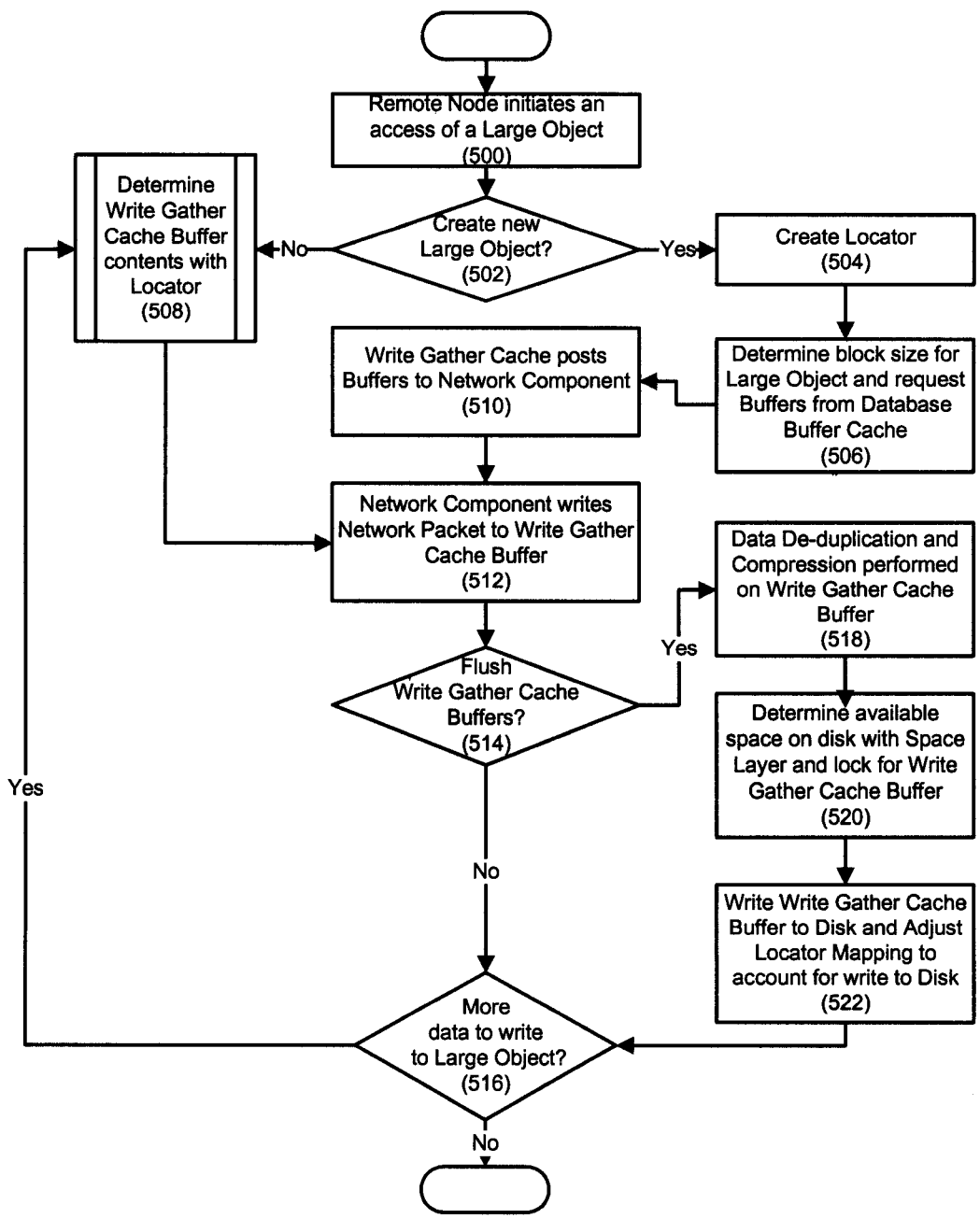
FIG. 5 is a flow chart of a process for implementing state maintenance in the access of a large object.

FIG. 5 is a flow chart of a process for implementing state maintenance in the access of a large object. Initially, a Remote Node 200 initiates an access of a large object (500) in the Database Management System 206. For purposes of example, the access illustrated in FIG. 5 requires the Remote Node 200 to write to a large object but a similar process could be used for any type of access of a large object. Next, the database server determines whether the Remote Node 200 is accessing an existing large object or whether a new large object should be created (502). If the Remote Node 200 creates a new large object (502), then the database server creates a new Locator (504), a handle for the large object that the Remote Node 200 intends to access during the transaction. Next, the Database Management System 206 determines the appropriate block size for the large object and the Write Gather Cache Layer 214 requests buffers from the Database Buffer Cache 206 (506) with the appropriate block size.

Alternatively in FIG. 5, if the Remote Node 200 is not creating a new large object (502), then the Remote Node 200 needs to access an existing large object in the Database Management System 206. To access an existing large object, the Write Gather Cache Layer 214 buffer (e.g. Buffer Blocks 1 ... N 304 of the Write State Objects 1 ... N 302 of the File State Object 300 for the large object) contents will be determined with the existing Locator 208 (508) which will be described in more detail with FIG. 6.

Continuing with FIG. 5, after the Write Gather Cache Layer 214 buffers are either requested from the Database Buffer Cache 206 for a new large object (506) or the Write Gather Cache Layer 214 buffers are determined with a Locator 208 (508), the Write Gather Cache Layer 214 posts the buffers to the Network Component 207 (510). The Network Component 207 may access the data (e.g. writes the network data) for the Remote Node 200 by writing the Network Packet 202 to the Write Gather Cache Layer 214 buffer (512). Next, the Write Gather Cache Layer 214 determines if the buffer needs to be flushed (514). If the Write Gather Cache Layer 214 buffer does not need to be flushed (514), then the process will repeat if the Remote Node has more data to write to the large object (516).

Alternatively, if the Write Gather Cache Layer 214 requires a flush of the Write Gather Cache buffers (514), then the Write Gather Cache Layer 214 will write the buffer contents to Disk 212. The storage of the large object data accessed by the Remote Node 200 in the Write Gather Cache Layer 214 buffers allows the Database Management System 206 to write the buffers in contiguous blocks on Disk 212. In one or more embodiments, data de-duplication and compression may be performed on the Write Gather Cache Layer 214 buffers (518) prior to writing the data to Disk 212 with the De-duplication and Compression Layer 218.

The storage of the large object in the Write Gather Cache Layer 214 buffers allows the Database Management System 206 to compress and perform de-duplication for the large object. Because the large object is stored in the Write Gather Cache Layer 214 buffers, compression can be performed upon the entire or a portion of the large object that is larger than the Network Packet 202 instead of performing compression on a Network Packet 202 available with prior approaches. De-duplication allows for the storage of one large object and a pointer to the large object by another large object with the same data. Because the large object is not being written to Disk 212 upon receipt of each Network Packet 202, candidates for de-duplication can be identified prior to a write to Disk 212.

After the large object data has optionally been compressed and gone through de-duplication (518), the availability of disk space must be determined and locked for the large object (520). In one or more embodiments, the Space Layer 220 determines what space is available on Disk 212. In one or more embodiments, the Write Gather Cache Layer 214 will lock all disk space on the Disk 212 for the large object instead of locking memory on Disk 212 on a block by block basis upon receipt a Network Packet 202.

Continuing with FIG. 5, after the space available for the Write Gather Cache 214 buffer has been determined and locked, then the Write Gather Cache Layer 214 writes the Write Gather Cache buffer to Disk 212 (522). The process may repeat (508) if the Remote Node 200 has more data to access in the large object (516). If the Remote Node 200 has no more data to access (516), then the process ends.

Figure 7:
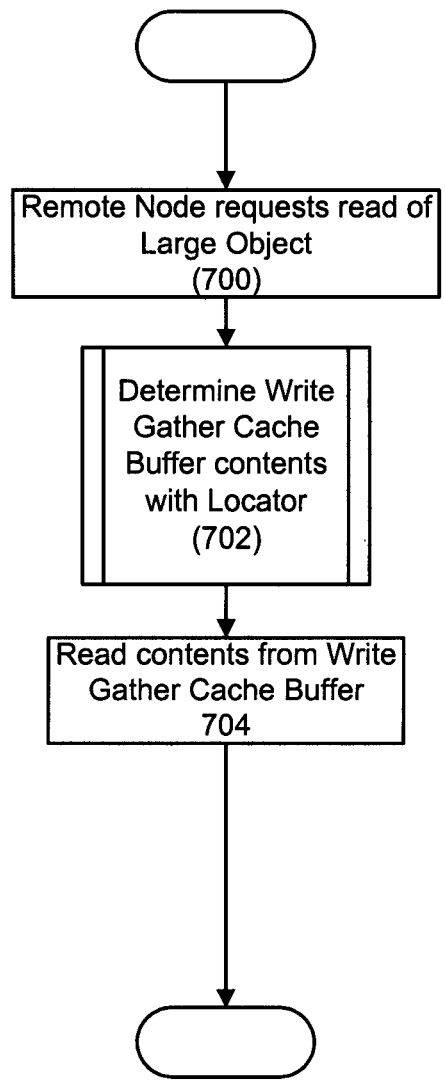
FIG. 7 is a flowchart for an implementation for state maintenance for the access of a large object.

FIG. 7 is a flowchart for an implementation for state maintenance for the access of a large object. Although FIG. 7 illustrates a read access of a large object, those skilled in the art will recognize that a similar process could be used for any type of access of a large object. Initially, a Remote Node 200 makes a request to the Database Management System 206 to access (e.g. read) a large object (700) and the Write Gather Cache Layer 214 must determine the Write Gather Cache Layer 214 buffer contents with a Locator for the large object (702).

Figure 6:
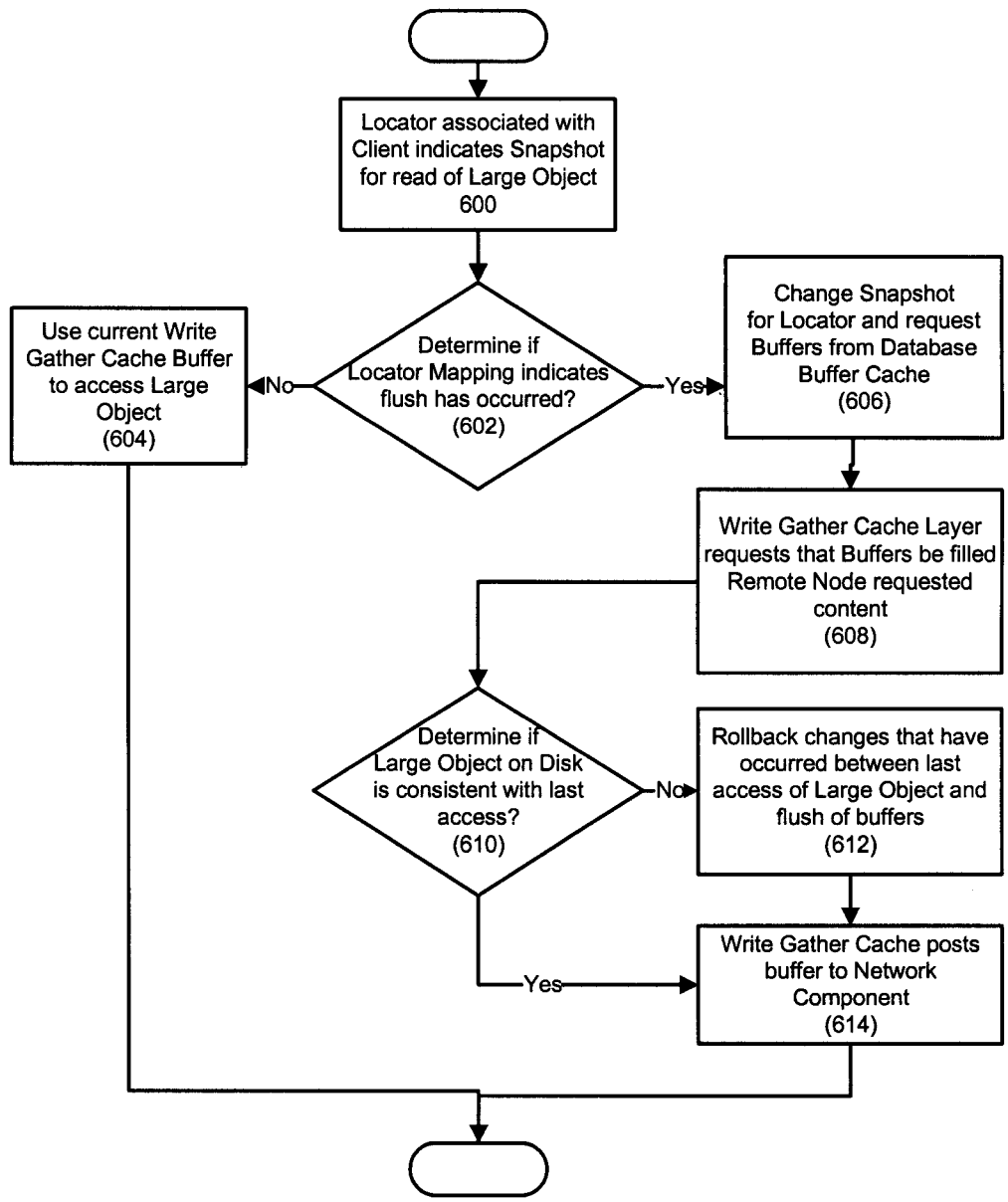
FIG. 6 is a flowchart for determining the Write Gather Cache Layer buffer contents with a Locator for a large object.

FIG. 6 is a flowchart for determining the Write Gather Cache Layer buffer contents with a Locator for a large object. The Locator 208 associated with the transaction of a Remote Node 200 indicates the state of the large object from the last access by the Remote Node 200 in the transaction (600). In one or more embodiments, the Locator 208 may have a snapshot of a database after a last access or query execution of the large object by the Remote Node 200 in the transaction. Next, the Write Gather Cache Layer 214 must determine if the Locator Mapping 216 indicates if the buffers in the Write State Object 1 . . . N of the File State Object 300 for the large object have been flushed, written to Disk 212 (602), or need to be flushed. In one or more embodiments, the Locator Mapping 216 stores a snapshot of the database after the last flush of the database to provide the mapping to the Locator 208. If the buffers for the large object being accessed by the Remote Node 200 in the transaction have not been flushed, then the Remote Node 200 can use the buffers in the Write Gather Cache Layer 214 (604). The Write Gather Cache Layer 214 may post the buffers to the Network Component 207 if the buffers are not still identified as the buffers to write to for the transaction of the Remote Node 200 (614) and the process ends.

Continuing with FIG. 6, alternatively if the Locator Mapping 216 indicates that a flush has occurred since the last access by the Remote Node 200 (602), then the Locator 208 is updated with the snapshot of the flush of the buffers for the large object in the transaction, and the Write Gather Cache Layer 214 will request buffers from the Database Buffer Cache (606). Next, the Write Gather Cache Layer 214 requests that the Database Management System 206 fill the buffers with the content requested from the large object data by the Remote Node 200 (608). In one or more embodiments, the Database Management System 206 may rely on the Locator Mapping 216 snapshot to bring the requested data for the large object into the Write Gather Cache Layer 214 buffer (608) as of a desired point in time. Embodiments may allow the Remote Node 200 to request specific content from a large object with a logical offset 402 (e.g. a chapter in a movie) that may be mapped to a specific address 404 on Disk 212 and the corresponding length 406 of the large object logical division with the Inode Chunk Map 400 (608).

Next, the Database Management System 206 may determine if the large object data placed in the buffers of the Write Gather Cache Layer 214 from Disk 212 is consistent with the last access by the Remote Node 200 in the transaction (610). If the data of the large object placed in the buffer of the Write Gather Cache Layer 214 for the transaction of the Remote Node 200 is consistent, then the Write Gather Cache Layer 214 posts the buffers to the Network Component (614) and the process ends Continuing with FIG. 6, alternatively if the data for the large object on Disk 212 is inconsistent with the last access by the Remote Node 200, then the changes that have occurred between the last access of the large object and the flush of the Write Gather Cache Layer 314 buffers may be rolled back by the Database Management System 206 to ensure that the buffer data is consistent with the data in the large object that the Remote Node 200 expects from the last access of the large object in the transaction (612). Next, the Write Gather Cache Layer 214 posts the buffers to the Network Component (614) for use by the Remote Node 200 in the transaction and the process ends.

Continuing with FIG. 7, the Remote Node 200 may now read the data of the Write Gather Cache Layer 214 Buffer to access the large object (706).

System Architecture

Figure 8:
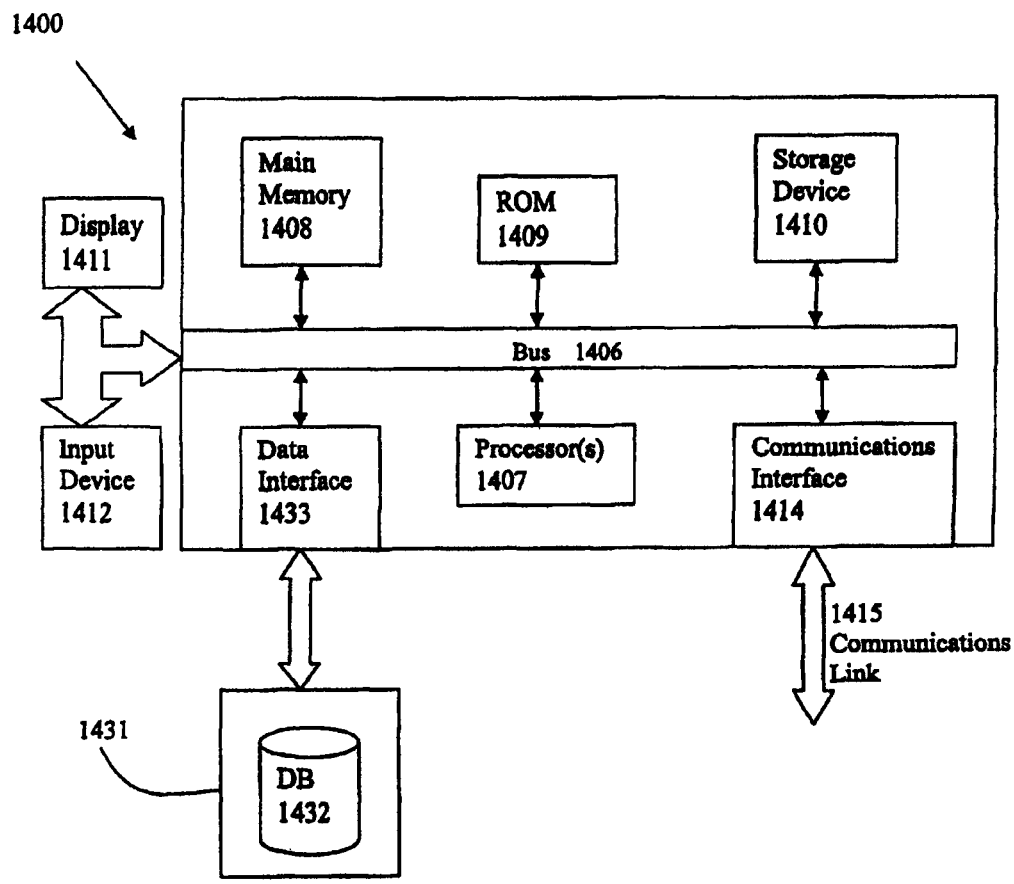
FIG. 8 is a block diagram of the functional components of a computer system for an implementation for state maintenance for the access of a large object.

The execution of the sequences of instructions required to practice the embodiments may be performed by a computer system 1400 as shown in FIG. 8. In an embodiment, execution of the sequences of instructions is performed by a single computer system 1400. According to other embodiments, two or more computer systems 1400 coupled by a communication link 1415 may perform the sequence of instructions in coordination with one another. Although a description of only one computer system 1400 will be presented below, however, it should be understood that any number of computer systems 1400 may be employed to practice the embodiments.

A computer system 1400 according to an embodiment will now be described with reference to FIG. 8, which is a block diagram of the functional components of a computer system 1400. As used herein, the term computer system 1400 is broadly used to describe any computing device that can store and independently run one or more programs.

Each computer system 1400 may include a communication interface 1414 coupled to the bus 1406. The communication interface 1414 provides two-way communication between computer systems 1400. The communication interface 1414 of a respective computer system 1400 transmits and receives electrical, electromagnetic or optical signals, that include data streams representing various types of signal information, e.g., instructions, messages and data. A communication link 1415 links one computer system 1400 with another computer system 1400. For example, the communication link 1415 may be a LAN, in which case the communication interface 1414 may be a LAN card, or the communication link 1415 may be a PSTN, in which case the communication interface 1414 may be an integrated services digital network (ISDN) card or a modem, or the communication link 1415 may be the Internet, in which case the communication interface 1414 may be a dial-up, cable or wireless modem.

A computer system 1400 may transmit and receive messages, data, and instructions, including program, i.e., application, code, through its respective communication link 1415 and communication interface 1414. Received program code may be executed by the respective processor(s) 1407 as it is received, and/or stored in the storage device 1410, or other associated non-volatile media, for later execution.

In an embodiment, the computer system 1400 operates in conjunction with a data storage system 1431, e.g., a data storage system 1431 that contains a database 1432 that is readily accessible by the computer system 1400. The computer system 1400 communicates with the data storage system 1431 through a data interface 1433. A data interface 1433, which is coupled to the bus 1406, transmits and receives electrical, electromagnetic or optical signals, that include data streams representing various types of signal information, e.g., instructions, messages and data. In embodiments, the functions of the data interface 1433 may be performed by the communication interface 1414.

Computer system 1400 includes a bus 1406 or other communication mechanism for communicating instructions, messages and data, collectively, information, and one or more processors 1407 coupled with the bus 1406 for processing information. Computer system 1400 also includes a main memory 1408, such as a random access memory (RAM) or other dynamic storage device, coupled to the bus 1406 for storing dynamic data and instructions to be executed by the processor(s) 1407. The main memory 1408 also may be used for storing temporary data, i.e., variables, or other intermediate information during execution of instructions by the processor(s) 1407.

The computer system 1400 may further include a read only memory (ROM) 1409 or other static storage device coupled to the bus 1406 for storing static data and instructions for the processor(s) 1407. A storage device 1410, such as a magnetic disk or optical disk, may also be provided and coupled to the bus 1406 for storing data and instructions for the processor(s) 1407.

A computer system 1400 may be coupled via the bus 1406 to a display device 1411, such as, but not limited to, a cathode ray tube (CRT), for displaying information to a user. An input device 1412, e.g., alphanumeric and other keys, is coupled to the bus 1406 for communicating information and command selections to the processor(s) 1407.

According to one embodiment, an individual computer system 1400 performs specific operations by their respective processor(s) 1407 executing one or more sequences of one or more instructions contained in the main memory 1408. Such instructions may be read into the main memory 1408 from another computer-usable medium, such as the ROM 1409 or the storage device 1410. Execution of the sequences of instructions contained in the main memory 1408 causes the processor(s) 1407 to perform the processes described herein. In alternative embodiments, hard-wired circuitry may be used in place of or in combination with software instructions. Thus, embodiments are not limited to any specific combination of hardware circuitry and/or software.

The term "computer-usable medium," as used herein, refers to any medium that provides information or is usable by the processor(s) 1407. Such a medium may take many forms, including, but not limited to, non-volatile, volatile and transmission media. Non-volatile media, i.e., media that can retain information in the absence of power, includes the ROM 1409, CD ROM, magnetic tape, and magnetic discs. Volatile media, i.e., media that can not retain information in the absence of power, includes the main memory 1408. Transmission media includes coaxial cables, copper wire and fiber optics, including the wires that comprise the bus 1406. Logic refers to software, hardware or any combination of software and hardware.

In the foregoing specification, the embodiments have been described with reference to specific elements thereof. It will, however, be evident that various modifications and changes may be made thereto without departing from the broader spirit and scope of the embodiments. For example, the reader is to understand that the specific ordering and combination of process actions shown in the process flow diagrams described herein is merely illustrative, and that using different or additional process actions, or a different combination or ordering of process actions can be used to enact the embodiments. The specification and drawings are, accordingly, to be regarded in an illustrative rather than restrictive sense.

The invention claimed is:

1. A computer implemented method for state maintenance of a large object, comprising:
   using at least one computer processor that performs a process, the process comprising:
   identifying or initiating a transaction for fulfilling multiple input/output (I/O) requests for an access by a remote node to the large object from a server;
   gathering multiple pieces of data of the large object in at least one of multiple buffers on the server, rather than on network buffers, for a duration of the transaction by at least associating the multiple buffers with the transaction;
   determining whether the multiple pieces of data in the at least one of the multiple buffers are consistent with a state expected by the remote node, wherein
      a first data object is associated with the transaction and includes information indicative of the state of the multiple pieces of data in the at least one of the multiple buffers and whether the multiple pieces of data have changed since a last access request for the large object by the remote node;
   filling the multiple buffers with data that is consistent with the state expected of the large object by the remote node by using at least a second data object associated with a last flush of the multiple buffers when the information indicates that the multiple pieces of data in the at least one of the multiple buffers are not consistent with the state expected by the remote node since the last access request;
   fulfilling the multiple input/output requests for the access to the large object by transmitting the multiple pieces of data in the at least one of the multiple buffers, wherein the act of fulfilling the multiple input/output requests is performed by using at least an atomic property of the transaction; and
   maintaining, on the server, state information pertaining to access to the large object by the remote node by tracking the state information with a locator mapping on the server for at least the duration of the transaction.

2. The method of claim 1 for state maintenance of a large object, wherein the access by the remote node to the large object comprises a write access to the large object.

3. The method of claim 1 for state maintenance of a large object, further comprising:
   associating a first snapshot of a database with the transaction involving the large object, wherein the first snapshot indicates the state after the last access request for the large object; and
   indicating a number of transactions on the large object as creating inconsistent data in the multiple buffers associated with the transaction based at least in part upon the first snapshot.

4. The method of claim 3 for state maintenance of a large object, further comprising:
   associating a second snapshot of the database with the last flush of the multiple buffers for the large object; and
   writing data to the multiple buffers for the large object from storage using at least the second snapshot.

5. The method of claim 1 for state maintenance of a large object, further comprising:
compressing data in the multiple buffers before writing the data for the large object to a persistent storage device.

6. The method of claim 1 for state maintenance of a large object, further comprising:
comparing data for the large object in the multiple buffers to data for one or more large objects previously written to a persistent storage device; and
removing duplication of the data for the one or more large objects in the persistent storage device by creating a pointer to an identical large object to the large object in the multiple buffers.

7. The method of claim 1 for state maintenance of a large object, further comprising:
receiving a request to access the large object at a database management system; and
providing the multiple buffers from a database buffer cache of the database management system.

8. A computer program product comprising a non-transitory computer usable storage medium having executable code which, when executed by at least one computer processor, causes the at least one computer processor to execute a process for implementing state maintenance for a large object in a computing system, the process comprising:
using the at least one computer processor to perform a process, the process comprising:
identifying or initiating a transaction for fulfilling multiple input/output (I/O) requests for an access by a remote node to the large object from a server;
gathering multiple pieces of data of the large object in at least one of multiple buffers on the server, rather than on network buffers, for a duration of the transaction by at least associating multiple buffers with the;
determining whether the multiple pieces of data in the at least one of the multiple buffers are consistent with a state expected by the remote node, wherein
a first data object is associated with the transaction and includes information indicative of the state of the multiple pieces of data in the at least one of the multiple buffers and whether the multiple pieces of data have changed since a last access request for the large object by the remote node;
filling the multiple buffers with data that is consistent with the state expected of the large object by the remote node by using at least a second data object associated with a last flush of the multiple buffers when the information indicates that the multiple pieces of data in the at least one of the multiple buffers are not consistent with the state expected by the remote node since the last access request;
fulfilling the multiple input/output requests for the access to the large object by transmitting the multiple pieces of data in the at least one of the multiple buffers, wherein the act of fulfilling the multiple input/output requests is performed by using an atomic property of the transaction; and
maintaining, on the server, state information pertaining to access to the large object by the remote node by tracking the state information with a locator mapping on the server for at least the duration of the transaction.

9. The computer program product of claim 8, wherein the access by the remote node to the large object comprises a write access to the large object.

10. The computer program product of claim 8, wherein the process further comprises:

associating a first snapshot of a database with the transaction involving the large object, wherein the first snapshot indicates the state after the last access request for the large object; and
indicating a number of transactions on the large object as creating inconsistent data in the multiple buffers associated with the transaction based at least in part upon the first snapshot.

11. The computer program product of claim 10, wherein the process further comprises:
associating a second snapshot of the database with the last flush of the multiple buffers for the large object; and
writing data to the multiple buffers for the large object from storage using at least the second snapshot.

12. The computer program product of claim 8, wherein the process further comprises:
compressing data in the multiple buffers before writing the data for the large object to a persistent storage device.

13. The computer program product of claim 8, wherein the process further comprises:
comparing data for the large object in the multiple buffers to data for one or more large objects previously written to a persistent storage device; and
removing duplication of the data for the one or more large objects in the persistent storage device by creating a pointer to an identical large object to the large object in the multiple buffers.

14. The computer program product of claim 8, wherein the process further comprises:
receiving a request to access the large object at a database management system; and
providing the multiple buffers from a database buffer cache of the database management system.

15. A system for state maintenance of a large object, comprising:
at least one computer processor;
a memory coupled to the at least one computer processor and having instructions stored therein which, when executed by the at least one computer processor, cause the at least one computer processor to:
identify or initiate a transaction for fulfilling multiple input/output (I/O) requests for an access by a remote node to the large object on a server;
gather multiple pieces of data of the large object in at least one of multiple buffers on the server, rather than on network buffers, for a duration of the transaction by at least associate the multiple buffers with the transaction;
determine whether the multiple pieces of data in the at least one of the multiple buffers are consistent with a state expected by the remote node, wherein
a first data object is associated with the transaction and includes information indicative of the state of the multiple pieces of data in the at least one of the multiple buffers and whether the multiple pieces of data have changed since a last access request for the large object by the remote node;
fill the multiple buffers with data that is consistent with the state expected of the large object by the remote node by using at least a second data object associated with a last flush of the multiple buffers when the information indicates that the multiple pieces of data in the at least one of the multiple buffers are not consistent with the state expected by the remote node since the last access request;
fulfill the multiple input/output requests for the access to the large object by transmitting the multiple pieces of data in the at least one of the multiple buffers, wherein the act of fulfilling the multiple input/output requests is performed by using an atomic property of the transaction; and maintain, on the server, state information pertaining to access to the large object by the remote node by tracking the state information with a locator mapping on the server for at least the duration of the transaction.

16. The system of claim 15, wherein the access by the remote node to the large object comprises a write access to the large object.

17. The system of claim 15, further comprising:
a cache associated a first snapshot of a database with the transaction involving the large object, wherein the first snapshot indicates the state after the last access request for the large object; and
a database management system that indicates a number of transactions on the large object as creating inconsistent data in the multiple buffers for the transaction based upon the first snapshot.

18. The system of claim 15, further comprising:
a mapping associating a second snapshot of the database with the last flush of the multiple buffers for the large object; and
a cache writing data to the multiple buffers for the large object from a persistent storage device using at least the second snapshot.

19. The system of claim 15, further comprising:
a compression layer compressing data in the multiple buffers before writing the data for the large object to a persistent storage device.

20. The system of claim 15, further comprising:
a de-duplication layer comparing data for the large object in the multiple buffers to one or more large objects previously written to a persistent storage device, wherein the de-duplication layer further removes duplication of the data for the one or more large objects in the persistent storage device by creating a pointer to an identical large object to the large object in the multiple buffers.

21. The system of claim 15, further comprising:
a database management system receiving a request to access the large object, wherein the database management system is further configured to provide the multiple buffers from a database buffer cache.

* * * * *

UNITED STATES PATENT AND TRADEMARK OFFICE
CERTIFICATE OF CORRECTION

PATENT NO. : 8,775,479 B2
APPLICATION NO. : 11/830642
DATED : July 8, 2014
INVENTOR(S) : Kumar et al.

Page 1 of 1

It is certified that error appears in the above-identified patent and that said Letters Patent is hereby corrected as shown below:

In the Drawings

On sheet 6 of 9, in figure 5, under Reference Numeral- 522, line 1, delete "Write Write" and insert -- Write --, therefor.

In the Specification

Column 5, line 51, delete "212.The" and insert -- 212. The --, therefor.

Column 8, line 9, delete "ends" and insert -- ends. --, therefor.

In the Claims

Column 11, line 35, in Claim 8, delete "the;" insert -- the transaction; --, therefor.

Signed and Sealed this
Twenty-fourth Day of February, 2015

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,775,479 B2 | Page 1 of 1 |
| APPLICATION NO. | : 11/830642 | |
| DATED | : July 8, 2014 | |
| INVENTOR(S) | : Kumar et al. | |

It is certified that error appears in the above-identified patent and that said Letters Patent is hereby corrected as shown below:

On the title page, in the illustrative figure, under Ref. Numeral 522, line 1, delete "Write Write" and insert -- Write --.

In the Drawings

On sheet 6 of 9, in figure 5, under Reference Numeral 522, line 1, delete "Write Write" and insert -- Write --, therefor.

In the Specification

Column 5, line 51, delete "212.The" and insert -- 212. The --, therefor.

Column 8, line 9, delete "ends" and insert -- ends. --, therefor.

In the Claims

Column 11, line 35, in Claim 8, delete "the;" insert -- the transaction; --, therefor.

This certificate supersedes the Certificate of Correction issued February 24, 2015.

Signed and Sealed this
Seventeenth Day of March, 2015

Michelle K. Lee
*Director of the United States Patent and Trademark Office*